United States Patent [19]

Harper et al.

[11] 4,432,913
[45] Feb. 21, 1984

[54] LIQUID DISTRIBUTING APPARATUS AND METHOD FOR A LIQUID-VAPOR CONTACT COLUMN

[75] Inventors: Stephen M. Harper, Lake Jackson; Jeffrey H. Stultz, Freeport, both of Tex.

[73] Assignee: The Dow Chemical Company, Midland, Mich.

[21] Appl. No.: 469,077

[22] Filed: Feb. 23, 1983

Related U.S. Application Data

[63] Continuation-in-part of Ser. No. 298,058, Aug. 31, 1981, abandoned.

[51] Int. Cl.³ .............................................. B01F 3/04
[52] U.S. Cl. ..................................... 261/97; 239/193
[58] Field of Search ......................... 261/97; 239/193

[56] References Cited

U.S. PATENT DOCUMENTS

| | | | |
|---|---|---|---|
| 632,795 | 9/1899 | Stoddart | 269/DIG. 11 |
| 1,673,732 | 6/1928 | Brooks | 261/114 R |
| 2,590,779 | 3/1952 | Lehmann | 261/97 |
| 3,006,623 | 10/1961 | Ross et al. | 261/97 |
| 3,290,025 | 12/1966 | Engalitcheff, Jr. | 261/97 |
| 3,360,246 | 12/1967 | Eckert . | |
| 3,392,967 | 7/1968 | Eckert . | |
| 3,446,489 | 5/1969 | Leva . | |
| 3,723,072 | 3/1973 | Carson et al. | 261/97 |
| 3,937,769 | 2/1976 | Strigle, Jr. et al. | |
| 4,126,540 | 11/1978 | Grosboll et al. | 261/97 |
| 4,264,538 | 4/1981 | Moore et al. | 261/97 |
| 4,267,978 | 5/1981 | Manteufel | 239/193 |

FOREIGN PATENT DOCUMENTS

| | | | |
|---|---|---|---|
| 1364649 | 8/1974 | United Kingdom . | |
| 573176 | 10/1977 | U.S.S.R. | 261/97 |

OTHER PUBLICATIONS

Norton, "Packed Tower Materials", ©1974, Catalog of Norton Co. of Akron, Ohio.
Chemical Engr.'s Handbook, Chilton, McGraw-Hill Book Co., ©1973, pp. 5-10, 5-11, 5-16, 5-17.

*Primary Examiner*—Tim R. Miles
*Attorney, Agent, or Firm*—M. W. Barrow

[57] ABSTRACT

Improved trough-type and plate-type liquid distributors and redistributors for use in vapor-liquid contact columns wherein uniform distribution of downflowing liquid is achieved by employing round orifices in the sides of vapor ducts and troughs, said orifices being sized such that they stay submerged. Even better distribution is obtained when small round orifices are used with adjacent vertical drip rods to which the liquid can adhere and follow downward. Invention allows good distribution for very low flow rates, e.g. less than 0.15 gallons/minute/square foot.

2 Claims, 9 Drawing Figures

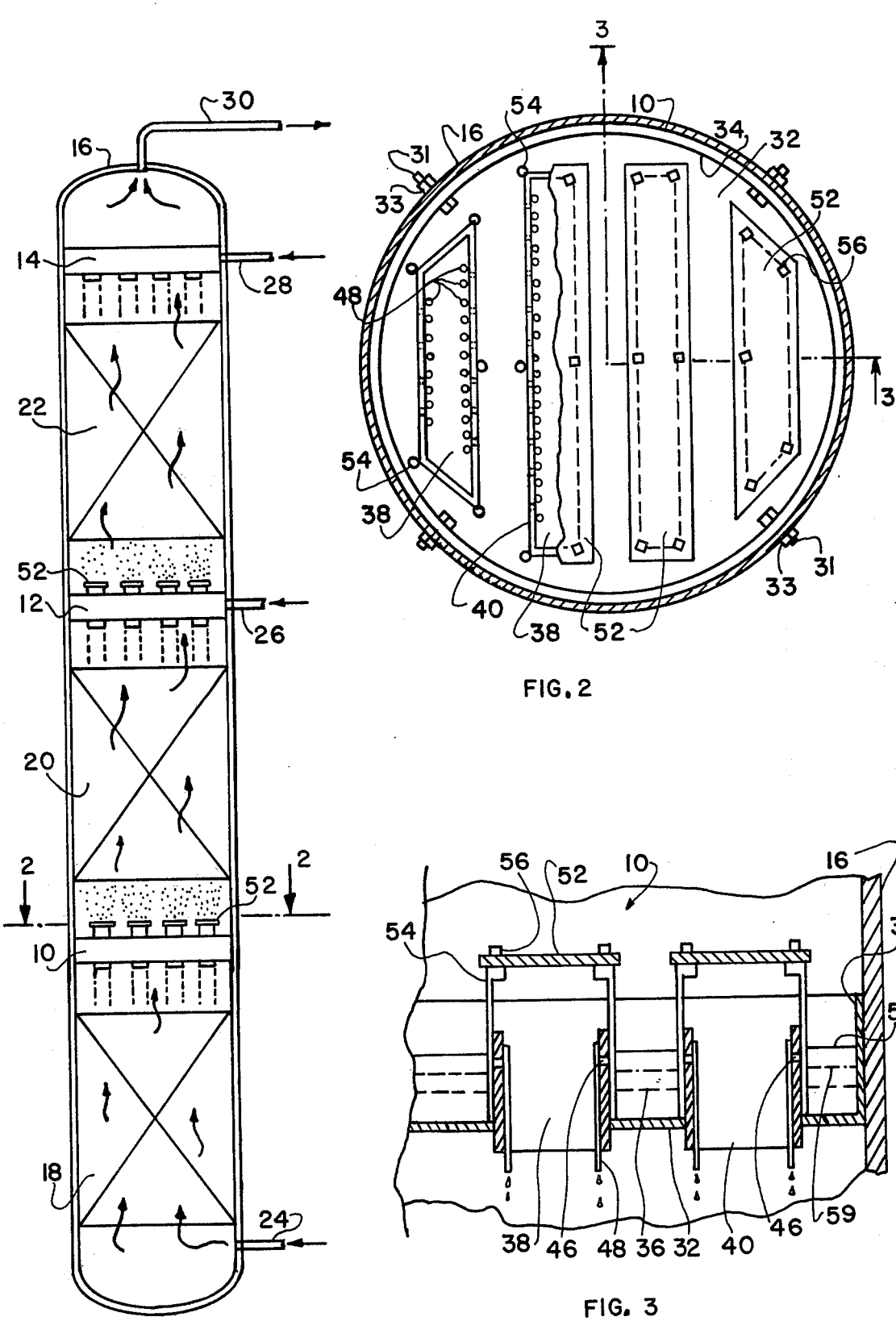
FIG. 1
FIG. 2
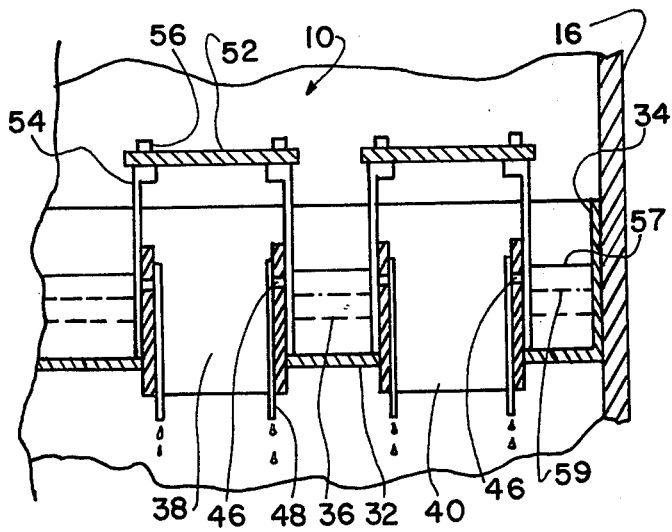
FIG. 3

LIQUID DISTRIBUTING APPARATUS AND METHOD FOR A LIQUID-VAPOR CONTACT COLUMN

CROSS REFERENCE TO RELATED APPLICATION

This application is a continuation-in-part of application Ser. No. 298,058, filed Aug. 31, 1981, now abandoned.

BACKGROUND OF THE INVENTION

1. Field of The Invention

This invention relates to a method and apparatus for uniformly distributing a downflowing liquid in a liquid-vapor contact tower. The invention is not limited to the instance where the vapor flows upwardly in the tower, i.e. countercurrent to the liquid; but rather the invention also includes those instances wherein the vapor flows downwardly, i.e. co-currently with the liquid in the tower. However, for clarity's sake the invention will be described as though the vapor is always rising to better contrast the vapor from the liquid which is always falling.

2. Definitions Used Herein

A. "Liquid Distribution Apparatus"

It is recognized that in this art field a distinction is often made between a liquid "distributor" and a liquid "redistributor" with the primary distinction being that a liquid distributor does not collect liquid droplets falling randomly from sources located above the distributor in the tower such as from tower packing while a liquid redistributor does. The liquid "distributor" is usually known as only being capable of distributing liquid which is fed directly to it while the liquid "redistributor" is known as being capable of doing this in addition to collecting maldistributed liquid falling from above and uniformly distributing both sources of liquid.

Those distinctions are of no consequence to the present invention inasmuch as it is suitable for both liquid "distributors" and liquid "redistributors". Therefore liquid distributors and liquid redistributors will be used interchangeably herein, and "liquid distributing apparatus" will be used as meaning either liquid distributors or liquid redistributors or both.

B. Trough-type Distributor

A trough-type distributor is one which employs a plurality of spaced troughs, having closed ends and which are usually parallel. Liquid is usually fed to these troughs from one or more so-called "parting boxes" or "splitters" located above the troughs. Located in the sides of such troughs are triangular or rectangular weirs. The bottoms of these weirs are usually located at the same horizontal height when the distributor is installed in a tower. Gas rising in the tower is allowed to pass between the spaced troughs while liquid falls from the weirs. A representative example of such weir-type distributors can be found in U.S. Pat. No. 3,937,769 which is incorporated herein by reference as if set forth at full length. In some instances the troughs have orifices cut in their bottoms. See British Pat. No. 1,364,649.

C. Plate-type Distributor

A plate-type distributor as used herein is one which collects the liquid on a horizontal plate in the tower. They have ducts extending upward from holes cut in the plate to allow rising gas to pass freely through the plate. The ducts are sealably attached to the plate so that liquid on the plate passing downward from the plate has to pass either through orifices cut in the plate or through weirs or orifices cut in the sides of the ducts.

3. Discussion of Prior Art

Liquid distributing apparatus are used for various purposes in variously named vapor-liquid contact towers. Examples of such towers are fractionating columns, rectifiers, strippers, absorbers, and the like. These towers are usually equipped with means for uniformly distributing a liquid to a region of extended surface contact. The region of extended surface contact is usually a region in the tower which is packed with the materials commonly used as packing for fractionating columns; e.g. Raschig rings, Lessing rings, Pall rings, cross-partition rings, single-, double- and triple spiral rings, Berl saddles, Intalox saddles, continuous wire, sponge wire, and the like.

The reason for using distribution and redistribution means in the above circumstances is to assure that uniform wetting of the packing by the draining liquid is achieved. This is done so as to achieve uniform contacting conditions between the descending liquid and ascending vapor. This type of contact enhances transfer of mass and heat between the liquid and vapor phases. Failure to wet the packing evenly results in unequal liquid mass flow density throughout its volume. Variations can range from completely dry areas to flooded areas, both conditions being detrimental to column functionality and, in cases of temperature-sensitive liquids, material decomposition. Solids formation and plugging can also occur in the low mass flow density "dry-spot" sectors.

Various types of apparatus for distributing and/or redistributing liquids in materials exchange columns already exist and are well known in the art. Such are the trough-type and plate-type distributors defined above. The principal function of these distributors is to uniformly distribute liquid draining through them onto a bed of column packing located below them while allowing the flow of vapors upwardly through them in a sufficiently free manner so as not to incur any significant pressure drop in this vapor. This liquid distribution is done for the purpose of having uniform, intimate, and efficient mixing of the liquid and vapors in the column packing.

These distributors are usually satisfactory for obtaining uniform distribution of liquid in the column packing, for large flow rates, e.g. flow rates greater than 2 gallons/minute/sq. foot. However, for low flow rates the known distributors have not been satisfactory. Particularly is this true in towers where the liquid to be distributed has a very small flow rate; e.g. from about 0.15 to about 0.8 gallons/minutes per square foot of horizontal cross-section of the tower as measured at the cross-section of the tower where the liquid distribution occurs. One problem with some of the trough and plate-type distributors is that the openings in their bottoms frequently plug up with debris or sediment from the liquid. This, of course, causes maldistribution of the liquid.

A liquid maldistribution problem common to all these liquid distributors (or redistributors) is the tendency of the liquid passing through them to wet the surface of the outlet of the distributor, adhere to this surface in a smearing fashion, and follow that surface to some unpredictable point where it drips off in some significantly maldistributed manner. This effect becomes more pronounced the further from perfectly horizontal the bottoms of these distributors are. Virtually all liquid distributors are less than perfectly horizontal when installed, and tend to become further so as the tower shifts further from the true vertical due to foundation shifting and the like.

Trough-type and plate-type distributors which have triangular or rectangular weirs in their sides of ducts, respectively, have a further disadvantage in producing a uniform liquid distribution. This disadvantage is that such uniform liquid distribution is greatly reduced by variations in liquid head pressure from weir to weir. These pressure variations can be either flow induced or produced from misfabrication or poor installation, or the like.

It is a common practice to design distributors so that, when liquid is flowed through weirs in the sides of troughs in trough-type distributors, or through similar weirs in the sides of ducts in plate-type distributors, the level of the liquid is maintained at a level below the tops of the weirs. The problem with such designs, however, is that they cannot produce acceptably uniform flow distribution at low flow rates (less than 2.0 gal./min./sq. ft.). This problem arises from being unable to maintain the bottom of the weirs at exactly the same horizontal height. Such deviation produces different head pressures above the bottom of the weirs. Of course, different head pressures will give different liquid flow rates out of the same weir; and when many of the same type weirs are used, as they are in these liquid distributors, and when the individual weirs have different head pressures, then there occur different flow rates from the different weirs. And, of course, different flow rates mean different liquid distribution, i.e. undesirable nonuniform liquid distribution.

One feature about triangular or rectangular weirs which those skilled in the art have apparently failed to appreciate is the difference in changes in flow rates out of unsubmerged different shaped weirs when subjected to different heat pressures. The flow rate out of an unsubmerged triangular weir is proportional to the head pressure raised mathematically to about the 2 ½ power. Thus a slight head pressure variation in such a distributor will cause a proportionally small head pressure difference above the many triangular weirs spread across the distributor; but it will greatly multiply the difference in flow coming from the different weirs, and thus will greatly multiply the liquid flow maldistribution. Rectangular unsubmerged weirs are not as sensitive to different head pressures caused by slight head variations as are unsubmerged triangular weirs, but deviations still produce a disproportional flow variation from design flow rate. Through rectangular unsubmerged weirs the flow rate is proportional to the head pressure raised to about the 1.5 power.

On the other hand, flow through submerged openings is proportional to only about the square root (½ power) of the pressure head. Thus using submerged openings with variable head pressures produces a flow rate difference and maldistribution difference, but these differences are greatly suppressed when compared to the differences produced by triangular and rectangular weirs.

The present invention takes advantage of the use of submerged openings or orifices as well as greatly diminishing liquid maldistribution by other means including "drip rods" which are described herein below.

STATEMENT OF THE INVENTION

This invention is a liquid distributor capable of being used in a liquid-vapor materials exchange tower to improve the distribution of liquid flowing downwardly through vapor in such a tower so that more intimate mixing is obtained between the vapor and liquid. Preferably and usually in such towers, a bed of column packing is employed below the distributor. Oftentimes the distributor is used in a tower where there is also a bed of column packing above the distributor. This distributor has demonstrated uniform liquid distribution at a packing liquid irrigation rate of 0.15 gallons/minute per square foot of tower cross-sectional area. Uniform liquid distribution herein means distributing liquid at at least one distribution point per 20 in.$^2$ of tower cross-sectional area. Higher irrigation rates have been successfully demonstrated, and at lower rates than even 0.15 gal./min./ft.$^2$, there is no reason to believe that this apparatus will not operate satisfactorily.

The plate-type distributor of this invention has a horizontal plate member to which is sealably attached a leak-proof, upstanding flange about the plate's periphery. A reservoir is located above the plate and flange. The plate has a number of large openings in it which would appear to destroy the integrity of the reservoir, but this integrity is preserved by the presence of a vertical duct in each one of these openings. These ducts are sealably attached to the plate member in such a fashion so that the walls of the duct extend above the plate member. Preferably they also extend below the plate member. Thus if the reservoir contained liquid, the part of the ducts above the plate would appear somewhat as hollow islands in the liquid in the reservoir. Therefore, an accurate definition of the reservoir when considering only that part of it in which a level of liquid could be maintained is that space inside the flange above the plate except for that space therein occupied by the ducts. These ducts are sufficiently large enough in total cross-sectional area to provide a passageway through the plate through which rising or descending vapors can pass without incurring a significant pressure drop. The side of the duct wall (the inside) through which the vapors pass is defined as the "vapor side" while the opposite side (the outside) of the duct wall is defined as the "reservoir side". These vertical duct walls have a plurality of orifices of equal size passing through them at an equal and discrete distance above the horizontal plate member. These openings are not placed in the bottom of the reservoir through the plate as is often done because there they are much more prone to plug-up with debris in the liquid, and thus cause maldistribution of the liquid. By having these holes in the sides of the duct walls, they are much less likely to plug-up inasmuch as the debris mostly settles to the bottom of the reservoir. Floating debris which might plug triangular notch or rectangular notch overflow weirs in some types of distributors is less likely to plug the submerged orifices because these orifices are below the liquid surface and not in contact with the floating debris. The orifices are spaced a substantially uniform distance from one another with the ducts and openings in the horizontal plate member being so spaced as to allow this uniform spacing of the orifices.

This invention preferably also has a plurality of vertical drip rods attached to the vapor side of the duct walls in a manner such that they extend below the bottom of the duct walls and such that substantially every orifice has a pair of parallel, spaced drip rods associated with it in such a manner so that one rod of the pair is located adjacent to either side of the orifices at their opening on the ducts' vapor side. Thus a vertical drip rod pair form a channel with surfaces to which liquids flowing from the orifices can follow vertically downward by adhering to the drip rods. The liquid flows downwardly in the channel between the drip rods to the bottom of the drip rods. From these the liquid falls downwardly in the same pattern as it emerged from the orifices. Inasmuch as the drip rods' bottoms are the lowest points on the distributor, the liquid follows them downward instead of adhering to the bottom of the horizontal plate to some unknown points and then falling from the distributor in a maldistributed manner.

The distance between each pair of drip rods forming a channel is the same for each channel formed by pairs of drip rods. It is preferred that each drip rod of a pair forming a channel also be equidistant from its opening to which it is adjacent. But being equidistant in that manner is not essential. The drip rod pair can also be offset from the opening with one drip rod of the channel forming drip rod pair being closer to the opening than the other drip rod of that pair. But in this latter situation three things should be emphasized. First, the distance between the drip rods forming the channel for each opening is the same for all openings.

Secondly, the off-set is to the same side of each opening for all openings along the duct wall which they are off-set. That is, if the left drip rod of a pair of drip rods is at a greater distance from its opening than the right drip rod of the pair on the face of a duct wall, then all left drip rods of drip rod pairs on that duct wall face are spaced the same distance from their opening as is the first left drip rod. Similarly, all right drip rods are spaced the same distance as each other from their respective openings on that duct wall.

Thirdly, if off-set drip rod pairs are used on one duct, then the drip rods of all openings in the distributor duct wall sides must be adjusted so that each pair of drip rods are substantially uniformly spaced across the tower.

This off-set drip rod spacing can better be understood by reference to the discussion of FIGS. 5, 6 and 7 set forth below.

Suffice it now to say that for purposes of the claims, the phrase, "equidistant channels" includes the situations described above where the separate rods of drip rod pairs are off-set from their respective openings as well as when they are equidistant from their respective openings.

Regarding the drip rods of each pair being equidistant from their respective openings, there is one special situation which this invention covers which may not be readily apparent. This is the situation where the drip rods are spaced equidistant between each opening. In this situation one drip rod will serve as two insofar as forming pairs are concerned. That is, a drip rod to the left of one opening will also serve as the drip rod to the right of the next adjacent opening to the left of that drip rod.

Regarding the use of the word "adjacent" herein with respect to the relationship between drip rods and their openings, two points should be made. First, a drip rod stated as being adjacent to an opening means that the rod is near that opening, but not necessarily tangent to that opening. In fact, being tangent to an opening, although theoretically is the most preferred position for a drip rod, it is too close to call for in specifications sent to a fabrication shop. Such a specification runs the risk of having the machinists assemblying the unit set the drip rod slightly in front of the opening. It has now been discovered that placing a drip rod in front of an opening greatly disrupts the liquid flow rate from the opening. Hence, to avoid this potentiality, it is preferred to specify that the adjacent drip rod be located a distance from the opening which equals about one-half the diameter of the opening.

This invention also includes improvements for trough-type distributors for use in liquid-vapor contact towers wherein it is desired to uniformly distribute a liquid phase flowing downwardly from troughs spaced across the tower while allowing vapor to rise between the troughs. This distributor contains a plurality of spaced, parallel troughs, each of which has openings through its sides with said openings being located below the top and above the bottom of said sides. These openings are substantially uniformly spaced from one another and are located such that when the distributor is fitted in a tower for operation they are substantially all at the same horizontal level. These openings are each of the same size in cross-sectional area, and are sufficiently small in said area so as to be capable of maintaining liquid flowing into the troughs under design flow rates at a level in the troughs above the tops of the openings to insure that the liquid flowing through each opening has a slight head pressure upon it so that the liquid flow rate of the liquid streamlets flowing through said opening is substantially uniform from opening to opening.

Preferably the trough-type distributor described above further comprises a plurality of substantially vertical drip rods attached to the outside of the trough in such a fashion that substantially all of the openings have at least one vertical rod attached adjacent to each one of them and such that substantially all of these drip rods extend below the bottom of the trough so as to form a surface along which liquid emerging through the openings from the inside of the trough can adhere and flow downwardly to their bottom ends and from whence rod ends the liquid can fall in the same distribution pattern as are the pattern of the rods' bottom ends with respect to each other when placed in a liquid-vapor contact tower.

It is also preferably for the trough-type distributor described above to be one wherein substantially all of said openings each has a parallel pair of vertical drip rods associated with it, one rod of the pair being adjacent to the opening on one of the opening's sides while the other vertical rod of the pair is attached adjacent to the opening on the opening's opposite side. The space between the drip rod pairs serves as a channel down which the liquid can flow.

BRIEF DESCRIPTION OF THE DRAWINGS

FIG. 1 is a sectional elevation of a vapor-liquid tower containing three liquid distributors made according to the present invention.

FIG. 2 is a top view, shown partially broken away, of a plate-type distributor 10 made according to this invention as seen in FIG. 1 when viewed along line 2—2 in FIG. 1.

FIG. 3 is a sectional view of the plate-type distributor of FIG. 2 taken along line 3—3 of FIG. 2.

DETAILED DESCRIPTION OF THE PREFERRED EMBODIMENTS

A. Plate-type Distributor

Figure 4:
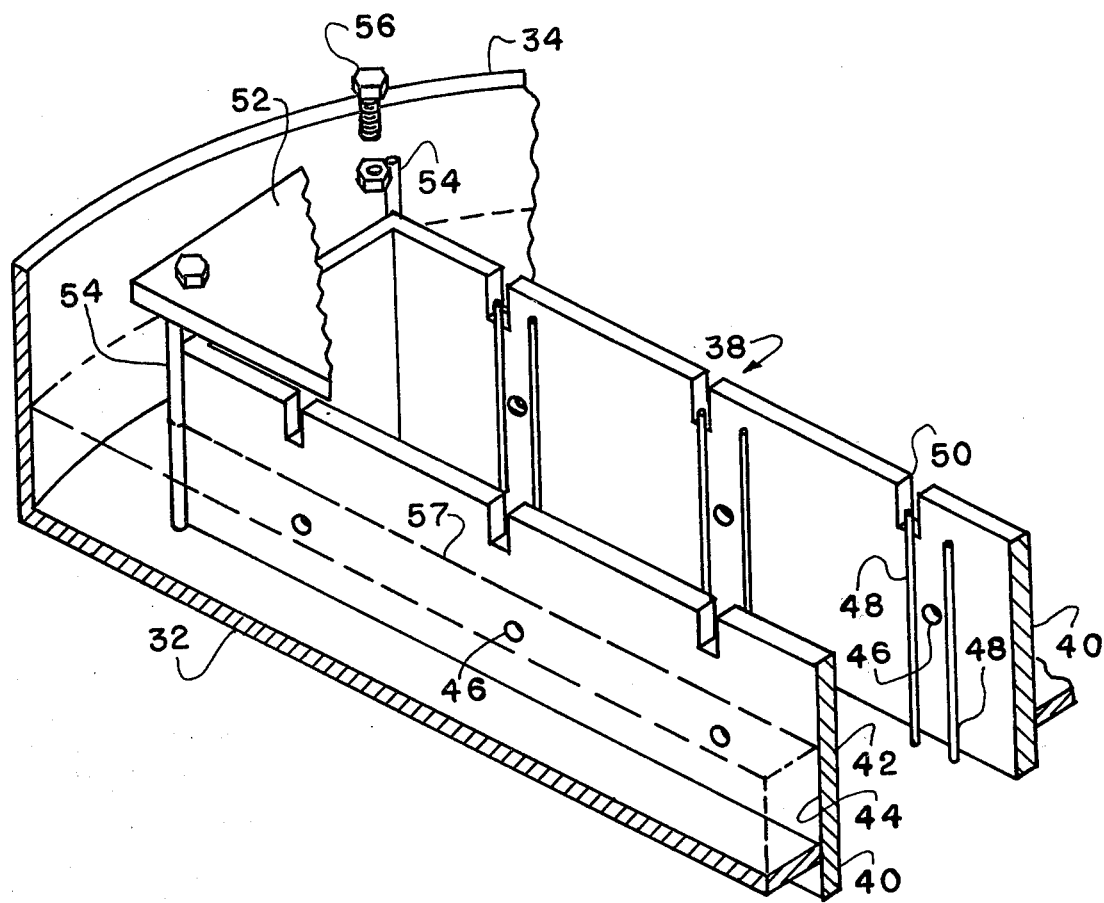
FIG. 4 is a fragmentary isometric view of the plate-type liquid redistributor of FIGS. 2 and 3.

By referring to FIG. 1, three preferred embodiments 10, 12, and 14 of the plate-type liquid redistributor of this invention can be seen situated at different levels in a vapor-liquid material exchange column tower 16. These three distributors 10, 12, 14 demonstrate different methods of feeding liquid to these distributors as well as giving a visual illustration of the vapors rising through tower 16 and the liquid dripping downwardly in tower 16 in a substantially uniformly distributed manner. The vapor flow is identified by upwardly directed, wavey arrows while the dripping liquid is represented by the dotted lines shown above and below each distributor 10, 12, 14. Beneath each distributor 10, 12, 14 is located a bed of column packing 18, 20, 22, respectively. Tower 16 is equipped with two liquid feed lines 26, 28, one vapor discharge line 30, and one vapor feed line 24.

As an example, tower 16 is given as operating as follows. Vapor is fed into the bottom of tower 16 from heating means (not shown) via line 24. Vapor rises upwardly as indicated by the wavey arrows, through column packing bed 18, distributor 10, column packing bed 20, distributor 12, column packing bed 22, distributor 14, and out of tower 16 via line 30. Liquid distributors 10 and 12 have liquid indiscriminately falling upon them from column packing beds 20, and 22 located above them, respectively. Within distributors 10 and 12, this liquid is redistributed so that it falls in a substantially uniformly distributed manner across the top of the column packing beds 18 and 20 located, respectively, below each one of them.

Distributors 12 and 14 also show how liquid such as reflux can be injected into them for distribution from outside sources via lines 26 and 28, respectively.

In the event there is no randomly falling liquid falling from above as is shown for distributor 14, then the distributors do not need a covering means such as roofs 52, shown more clearly in FIGS. 2, 3, and 4.

One further aspect of these distributors 10, 12, 14 is that they are capable of being sealably attached to the interior walls of tower 16 whenever leakage of liquid between the distributors 10, 12, 14 and the interior wall poses a problem as it nearly always does. Use of gasketing material and the like between the distributors and the tower will accomplish this.

By referring to FIGS. 2, 3, 4, and 5, a much better appreciation of the details of the distributor 10 of FIG. 1 may be obtained.

Distributor 10 is shown attached to tower 16 by bolts 31 and nuts 33. Other means of attachment such as welding could be used instead of bolts 31 and nuts 33.

Distributor 10 has horizontal plate member 32 to which is sealably attached vertical flange 34 around plate member's 32 periphery. Flange 34 extends above plate member 32 so as to form liquid reservoir 36 inside it and above plate member 32.

Plate member 32 has two rectangularly shaped openings and two trapezoidally-shaped openings cut through it in this particular embodiment. Each of these four openings has a duct 38 installed in it. These ducts 38 are defined by vertical duct walls 40 which are sealably attached (welded here) to plate member 32 in such a fashion so that duct walls 40 extend above and below plate member 32. Liquid reservoir 36, therefore, is more precisely defined as the space above horizontal plate 32, inside flange 34, and outside of ducts 38.

The shape of ducts 38 is not important. What is important is that their total horizontal cross-sectional area be sufficient to allow passage of rising vapors through them without incurring significant pressure drops while at the same time providing enough ducts 38 with walls 40 so spaced as to be able to provide duct walls 40 close enough together to distribute liquid in a satisfactorily uniform manner across an imaginary horizontal plane located immediately beneath distributor 10. This manner of liquid distribution will be discussed below, but for now it is important to emphasize that the shape of these ducts is not significant. For example, they could be circular or polygonal in horizontal cross-sectional shape.

It is convenient at this point to identify the two sides of duct walls 40 (FIG. 4). The inside of wall 40, on which side vapor rises freely through plate 32, is defined as the vapor side 42. A portion of the other side, or outside, of duct walls 40 above plate 32 is in contact with the liquid contained in reservoir 36 whenever liquid is present. This side of duct wall 40, therefore, is defined as the reservoir side 44. The presence of liquid in and around ducts 38 within reservoir 36 is shown in FIG. 3.

Figure 5:
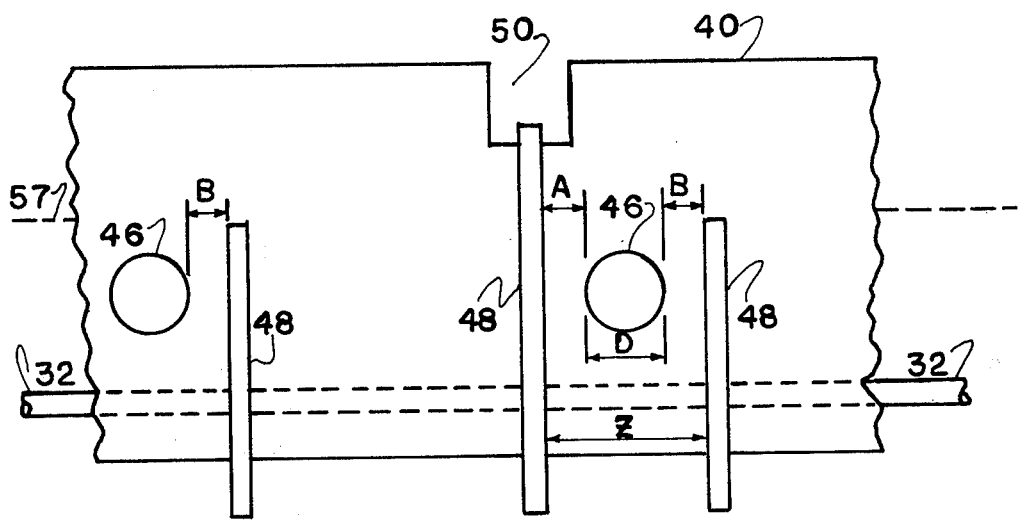
FIG. 5 is a side view of a segment of a duct wall 40 of distributor 10 as seen from its vapor side 42 showing the relationships between an orifice 46 in the duct wall 40 and its pair of drip rods 48 and the horizontal plate 32, and an overflow slot 50.

Referring now to FIGS. 4 and 5, a series of substantially uniformly spaced, round orifices 46 of the same diameter can be observed passing through the sides of duct walls 40. These orifices 46 are seen to be spaced at an equal distance above plate 32. The purpose of these orifices 46 is to allow liquid to pass from reservoir 36 through duct walls 40 to the vapor side 42 of the duct walls where it can fall in a substantially uniformly distributed manner into the tower space below distributor 10. (FIG. 3). These orifices are not placed on the bottom of the reservoir as is usually the custom for round orifices because it has been discovered that debris and sediment in the liquid tend to cause much more rapid plugging of holes on the bottom of a reservoir than holes not on the bottom. And, of course, plugging of distribution holes causes undesired maldistribution of the liquid.

Besides being round, having equal diameters, and being the same distance above plate 32, orifices 46 are also spaced at substantially the same distance from each other. These criteria provide substantially uniform distribution of the liquid as it drains from the outlets of orifices 46 on the vapor side 42 of duct walls 40. However, these criteria do not assure the same uniform distribution from the bottom of distributor 10 as from the outlets of orifices 46. Additional features need to be combined with them. These features include the extension of duct walls 40 below horizontal plate 32 along with the presence, proper location, and extension of vertical drip rods 48 below duct walls 40. These drip rods form an adhering surface to which liquid flowing from the small orifices 46 can adhere and thus flow directly downwardly by gravity.

Drip rods 48 are attached vertically to the vapor side 42 of duct walls 40 in such a manner so that they extend downwardly past the bottom of duct walls 40. Furthermore drip rods 48 are attached adjacent to each side of each orifice 46. Thus, each orifice 46 has a pair of drip rods 48 between which liquid can slowly flow vertically downward to the bottom tips of said drip rods 48. From drip rods 48, the liquid drips (see FIG. 3) in a substantially uniformly distributed manner through the space below distributor 10. It has been discovered that liquid often adheres to the bottom surface of plate 32 and tends to flow to the lowest part of plate 32. There it drips off in a maldistributed manner. However, when duct walls 40 extend below the bottom of plate 32 and when drip rods 48 are present and extend below the bottom of duct walls 40, this maldistribution does not occur. (See FIGS. 3, 4, 5, 6 and 7).

At this point it is convenient to set forth the various relationships that can exist between the openings and their adjacent pairs of drip rods. This can best be done by reference to FIGS. 5, 6 and 7. Each opening 46 has a pair of drip rods 48 associated with it, one of the drip rods 48 of the pair being adjacent to the opening on one side and the other drip rod 48 of the pair being adjacent to the opening on the opposite side. Adjacent is not used herein as merely meaning abutting, although abutting (i.e., tangent to) is included in the meaning of adjacent. Adjacent means nearby, or close to, or the one closest in a given direction.

In FIG. 5, there is shown the preferred drip rod 48 to opening 46 configuration. The left adjacent drip rod 48 is shown at a distance "A" from opening 46 while the right adjacent drip rod 48 of the pair is shown at a distance "B" from the opening 46. In FIG. 5, A=B and, moreover, A=B=one-half of the diameter, D, of the opening. The distance betwen the drip rods 48 of any pair of drip rods is given as "Z". In all embodiments the distance "Z" of all pairs of drip rods is constant in that embodiment. This space between pairs of drip rods is defined above as the "equidistant channel" for the opening 46 associated with that pair of drip rods 48.

Figure 6:
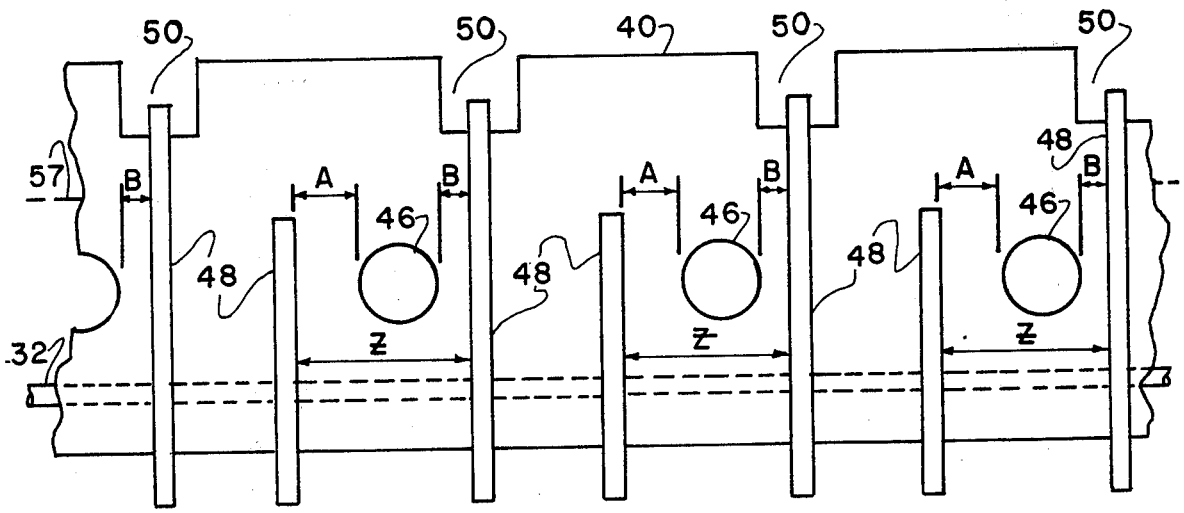
FIG. 6 is an alternative embodiment of that of FIG. 5 illustrating how pairs drip rods 48 can be offset from their respective openings 46, that is the distance "A" is not equal to the distance "B".

In FIG. 6, each pair of drip rods 48 associated with an opening 46 is off-set from that opening 46. Thus the distance "A" does not equal the distance "B". However, the distance "Z" is constant for each "equidistant channel". Also the distance "A" is constant for each opening 40 as is the distance "B" for each opening 40.

Figure 7:
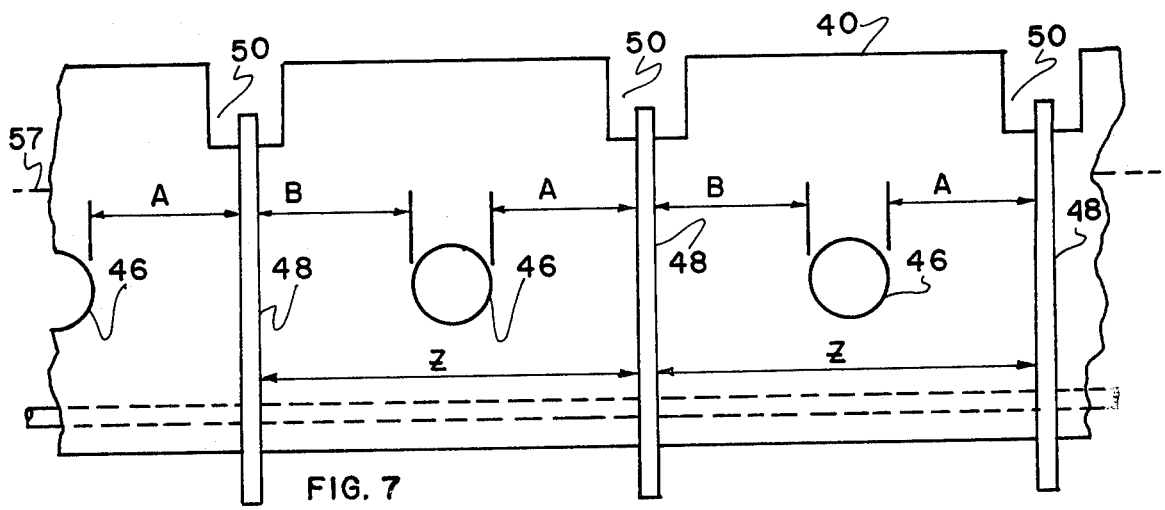
FIG. 7 is an alternative embodiment of that of FIG. 5 showing the special relationship between pairs of drip rods 48 to their respective openings 46 wherein one drip rod serves as a right side drip rod of a pair of drip rods for one opening but also serves as a left side drip rod of a pair of drip rods for an adjacent opening. This condition occurs only when the drip rods are spaced equidistant between the opening 46. Here again the distance "A" equals the distance "B".

In FIG. 7, the same constancy of the distances "A", "B" and "Z" exist across the duct wall 40. But the unique case is shown where the drip rods 48 are equidistant between openings 46. In this case, one drip rod 48 not only serves as the right drip rod 48 of a drip rod pair for one opening 46, but it also serves as the left drip rod 48 for the first opening 46 located to the right of the other opening 46.

Other specific configurations of drip rod pairs will come to mind which fit the criteria stated above in the statement of invention section for the relationships between the drip rod pairs and their associated openings.

While still referring to FIGS. 4 and 5, it will be convenient to notice the rectangular slots 50 cut in the tops of duct walls 40. Slots 50 are overflow slots which are present for the purpose of providing uniformity of distribution when liquid is fed too fast into reservoir 36 and the reservoir 36 overflows. Slots 50 are preferably cut to the same depth in vertical duct wall 40 and each slot is partially offset from the particular orifice 46 located below it. This offset is just enough so that one drip rod 48 extends upwardly into the slot 50 so as to act as a guide for liquid overflowing from reservoir 36 in much the same manner as it acts for liquid exiting from orifice 46.

The last feature of distributor 10 is a covering means which will prevent liquid falling from above distributor 10 from falling directly through ducts 38, but yet will allow vapor rising through ducts 38 to pass on upwardly around this covering means and out of distributor 10 without incurring significant pressure drop while passing through distributor 10. An example of such covering means are roofs 52 mounted directly above ducts 38. (See FIGS. 1, 2, 3, and 4). These roofs are supported by vertical nut-rods 54 at a sufficiently elevated position above the top of duct walls 40 to allow the passage of rising vapors therebetween without incurring a significant pressure drop. Nut-rods 54 are welded to duct walls 40. Roofs 52 are bolted to nut-rods 54 by bolts 56. Roof 52 is a leak-proof flat plate which can be horizontally or angularly mounted so long as it prevents liquid from falling directly into ducts 38. As mentioned above, roofs 52 are not necessary when liquid is piped directly into the reservoir 36 and no liquid is falling on the distributor as is shown with distributor 14 in FIG. 1.

B. Method of Distributing for Plate-type Distributor

The method of operation of distributor 10 is as follows. Liquid falling indiscriminately from above distributor 10 (represented by dotted lines in FIG. 1, downward arrows in FIG. 3) either falls directly into reservoir 36 or falls on top of roofs 52. From these tops the liquid flows off and down into reservoir 36. The liquid then flows from reservoir 36 through orifices 46 (see FIGS. 4 and 5) to the vapor side 42 of duct wall 40. There it contacts and adheres to the pairs of vertical drip rods 48 attached adjacent to each orifice 46 and also adheres to the segment of surface of duct wall 40 between the pairs of drip rods 48. As can be seen from FIGS. 4 and 5, this surface segment and pair of drip rods 48 forms a vertical channel down which liquid emerging from orifice 46 can flow. The liquid follows this channel to the bottom of duct wall 40 and then, adhering to the drip rods 48 only, it follows them until it reaches the tips of their bottom wherefrom it falls. Thus the liquid from the reservoir 36 is distributed from distributor in the same distribution pattern as the pattern in which the round orifices 46 and drip rods 48 are distributed across distributor 10.

The level of the liquid in reservoir 36 is maintained at a fairly constant level 57 (see FIG. 5) above the orifices 46 by sizing the orifices and controlling their number based on the flow rate of liquid normally expected to be flowing through the distributor.

In case this flow rate is increased to the point of overflow, from reservoir 36, this overflow is patterned into a substantially uniform distribution flow by the presence of notches 50 through which the overflow passes, and the presence of the drip rods 48 located in their bottoms. The overflow liquid adheres to these drip rods and flows downwardly to bottoms from whence it falls.

Vapor rising from below distributor 10 passes upwardly through ducts 38 to the open space between the top of ducts 38 and the bottom of roofs 52. From this open space the vapors deviate laterally enough from their upward flow to pass upwardly through the gaps between the roofs 52 and through the gaps between roofs 52 and the inside of the wall of tower 16.

The preferred embodiment of distributor 10 is cut into separate pieces so that it can be more easily passed through manways in towers. It is then reassembled within the tower. This cut and the flanges and bolts used to reassemble the distributor are not shown in the drawing as the details of it would tend to obscure the novel features of this distributor and since making this cut is well known to those skilled in the art.

C. Trough-type Embodiment

Figure 8:
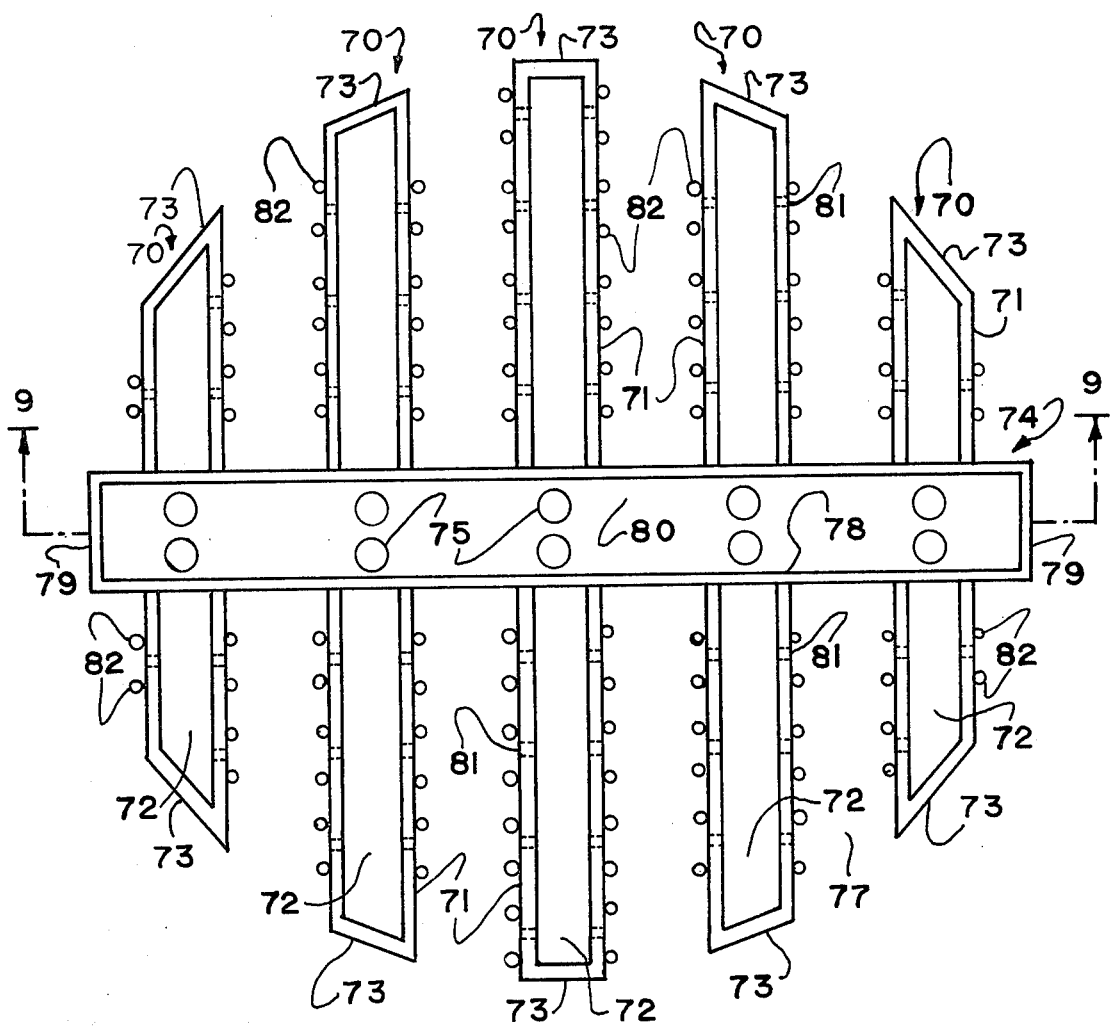
FIG. 8 is a top view of a trough-type liquid distributing apparatus made according to this invention.
Figure 9:
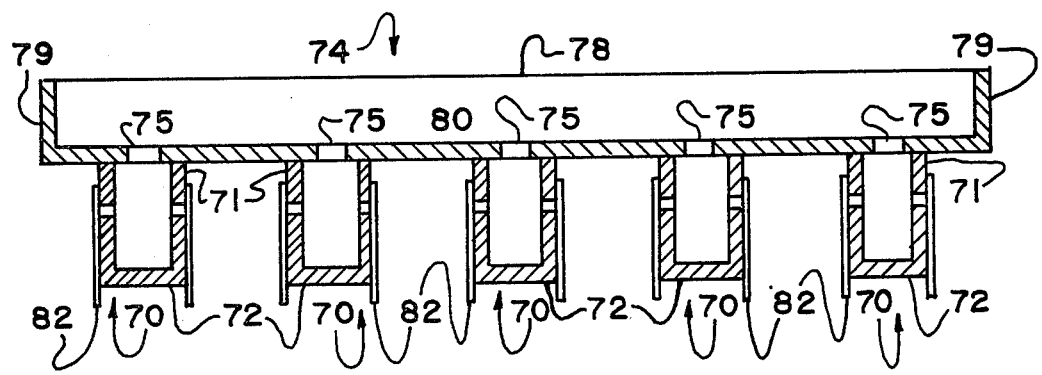
FIG. 9 is a sectional-view of the trough-type distributing apparatus of FIG. 7 as seen along line 9—9 in FIG. 8.

The preferred embodiment of the trough-type distributor of this invention can be seen by reference to FIGS. 8 and 9. Troughs 70 are generally box-like in shape. That is they have two vertical sides 71, a bottom 72, two closed ends 73, and an open top. Troughs 70 are horizontal, parallel to each other, and spaced from each other. Thus they are adapted to contain liquid. Troughs 70 have their ends 73 shaped in this embodiment for fitting into a cylindrical tower such as tower 16 in FIG. 1. Liquid is fed to troughs 70 from splitter box 74 via pairs of sized holes 75 located in the bottom 80 of said splitter box 74. Holes 75 are located above their respective troughs so that liquid will flow into the trough and not into the spaces 77 between troughs 70. Spaces 77 are present to allow gas rising from beneath the distributor to pass through the distributor without incurring significant pressure drop. Holes 75 are sized so that an amount of liquid which is proportional to the size of each trough 70 will flow into the different length troughs 70.

Splitter box 74 has sides 78, ends 79, bottom 80, and is generally open at its top.

In the sides 71 of troughs 70 are located a plurality of round orifices 81. These round orifices 81 are of all the same horizontal elevation in all the troughs 70. They are all of the same diameter. They are sized small enough such that for the liquid they are designed to allow to pass from the inside of trough 70 to its outside, the liquid level in trough 70 will be above the top of said round orifices 81; that is the round orifices 81 will be submerged with respect to the liquid level in troughs 70. Orifices 81 are also spaced from one another in a substantially uniform manner.

Associated with each orifice 81 is a pair of vertical, parallel, drip rods 82. Drip rods 82 are attached to the outside of troughs 70; that is, on the vapor side of troughs 70 as described above for the plate-type distributor. A drip rod 82 is located on and tangent to each side of each orifice 81. Thus when liquid emerges from the inside of trough 70 through an orifice 81, it contacts the pair of drip rods to which it can adhere and flow downwardly in the channel between the two parallel drip rods 82 associated with that round orifice 81. The drip rods 82 extend below the bottom of trough sides 71 so that there is even a better distribution pattern of the liquid. This better distribution is brought about because the liquid will adhere to the drip rods and follow them down to their bottom ends before they fall instead of adhering to the bottom 72 of trough 70 and running along it to some unknown site before dripping off. Liquid dripping from the predetermined sites of the bottoms of drip rods 82 provides much more capability of uniform flow distribution than from an unknown site on the bottom 72 of trough 70.

We claim:

1. A plate-type liquid distributor for use in a liquid-vapor contact tower wherein it is desired to uniformly distribute liquid across a horizontal cross-section of the tower while allowing vapor to rise through spaced vapor ducts situated in vapor openings in the pan of the apparatus, which apparatus comprises:

a plate which is horizontal when installed in the tower, said plate having a plurality of spaced openings passing through it to provide for upward passage of vapors rising in a tower;

an upstanding flange sealably attached to the periphery of the horizontal plate and extending above the plate;

a vertical duct member located in each opening of the horizontal plate, said duct members being open at top and bottom to allow upward passage of vapors through the apparatus, said vertical duct members being sealably attached to the horizontal plate member with the duct member's sides extending a distance far enough above said horizontal plate to define a liquid reservoir space above the plate between the outsides of the duct walls and the inside of the upstanding flange;

said duct walls having a plurality of openings in them located at the same distance above the plate to allow a liquid to accumulate in said reservoir and to pass out of the reservoir in streamlets through the openings in said duct walls while allowing most sediment contained in the liquid to settle to the bottom of said reservoir to greatly reduce the risk of plugging the openings with sediment and consequently upsetting the liquid distribution pattern designed for the distributor apparatus, said openings being spaced apart at a substantially uniform distance, the tops of said openings being located below the tops of the duct walls as well as below the top of the upstanding flange so that a liquid pool is capable of being maintained in said reservoir space with the pool's upper surface being capable of being situated above the tops of said openings, said openings being small enough in size so as to cause a liquid slowly flowing through them under normal operating conditions in a tower to form a pool in said reservoir space with the pool's upper surface being situated above the tops of said openings in order that any floating debris in the liquid will remain above said openings so as to further reduce the risk of plugging the small openings and upsetting the flow distribution pattern;

said duct members' vertical sides also extending below the horizontal plate member so that liquid flowing down the side walls can have no opportunity to transfer from the side wall to the bottom of the plate member and fall from it in an indiscriminate maldistributed manner;

a multiplicity of substantially parallel, substantially vertically oriented drip rods attached to the inside of the ducts, that is the vapor side of the duct walls, in such a fashion so that substantially all of the openings have a pair of drip rods associated with it, one drip rod being adjacent to an opening on one side of that opening and the other drip rod being adjacent that opening on the opposite side of that opening so as to form an "equidistant channel" between the two drip rods of the drip rod pair below the opening; and said drip rods extending below the bottom of the duct walls so that liquid emerging from the opening between will gravity flow downwardly in the "equidistant channel", past the bottom of said horizontal plate, and on downwardly and off the bottom ends of the drip rods into the tower section below the drip rods in the same distribution pattern as is the distribution pattern of the bottom ends of the drip rods.

2. The liquid distributing of claim 1 which further comprises a covering means located above the ducts for preventing liquid from falling from above directly into the ducts but which directs and allows liquid to fall into the reservoir area outside the ducts and is located sufficiently high to provide sufficient clearance between the ducts and covering means to allow vapors rising through the distributor to do so without incurring a significant pressure drop.

* * * * *